US008327003B2

(12) United States Patent
Newport (10) Patent No.: US 8,327,003 B2
(45) Date of Patent: Dec. 4, 2012

(54) HANDLING BACKEND FAILOVER IN AN APPLICATION SERVER (75) Inventor: William T. Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2580 days.

(21) Appl. No.: 11/050,293

(22) Filed: Feb. 3, 2005

(65) Prior Publication Data
US 2006/0173866 A1    Aug. 3, 2006

(51) Int. Cl.
G06F 15/16   (2006.01)
G06F 17/00   (2006.01)

(52) U.S. Cl. .......................... 709/229; 707/607
(58) Field of Classification Search .................. 709/229; 707/100
See application file for complete search history.

(56) References Cited

U.S. PATENT DOCUMENTS

| 5,553,239 | A | * | 9/1996 | Heath et al. ........................ 726/2 |
| 5,699,511 | A | * | 12/1997 | Porcaro et al. .................. 714/55 |
| 6,105,067 | A | * | 8/2000 | Batra ........................... 709/227 |
| 6,112,196 | A | | 8/2000 | Zimowski et al. |
| 6,185,695 | B1 | * | 2/2001 | Murphy et al. .................. 714/4 |
| 6,339,371 | B1 | | 1/2002 | Zimowski et al. |
| 6,564,252 | B1 | * | 5/2003 | Hickman et al. ............. 709/214 |
| 6,675,217 | B1 | * | 1/2004 | Dani et al. ..................... 709/229 |
| 7,181,491 | B2 | * | 2/2007 | Lu ................................. 709/203 |
| 7,370,064 | B2 | * | 5/2008 | Yousefi'zadeh .............. 707/200 |
| 2002/0023173 | A1 | * | 2/2002 | Jacobs et al. .................. 709/245 |
| 2005/0038801 | A1 | * | 2/2005 | Colrain et al. ................ 707/100 |
| 2005/0198327 | A1 | * | 9/2005 | Iwamura et al. ............. 709/229 |
| 2005/0289152 | A1 | * | 12/2005 | Earl et al. ..................... 707/100 |

OTHER PUBLICATIONS

U.S. Appl. No. 09/675,272, entitled "Database Connection Management and Apparatus," filed Sep. 29, 2000 by Tianyu Jiang.

* cited by examiner

Primary Examiner — Peling Shaw
Assistant Examiner — Thomas Richardson
(74) Attorney, Agent, or Firm — Martin & Associates, LLC; Derek P. Martin (57) ABSTRACT An application server includes a connection pool that specifies a number of allowable connections, and includes a backend failure detection mechanism and a backend failure recovery mechanism. When the backend failure detection mechanism detects that the backend fails, applications waiting on the hung connections may be notified of the backend failure. The backend failure detection mechanism will then detect when the backend recovers and becomes available once again. Once the backend is available again, the backend failure recovery mechanism increases the number of connections in the connection pool to compensate for the hung connections. As each hung connection is timed out using a network timeout mechanism, the number of allowable connections is reduced. Eventually all of the hung connections will time out, with the result being that the connection pool will contain the same specified number of allowable connections it originally had before the backend failed.

1 Claim, 6 Drawing Sheets

HANDLING BACKEND FAILOVER IN AN APPLICATION SERVER

BACKGROUND OF THE INVENTION

1. Technical Field

This invention generally relates to computer systems, and more specifically relates to application servers and how they respond to the failure of a backend.

2. Background Art

Many computer systems today are highly networked to provide a variety of different computing services. For example, client computer systems may connect to server computer systems to request certain services from the server computer systems. When a user uses a web browser to request a web page, the user's computer system typically opens a connection to a web server that hosts the web page, and the web server then delivers the requested web page to the user's web browser. One specific type of server that is known in the art is called an application server because it services requests from software applications. Application servers are often connected to various different backend systems, such as a database, a different application server, a messaging service, etc. The term "backend" as used herein means any computer system that may be coupled to an application server.

An application server often uses a "pool" of connections to connect to a backend. Maintaining a connection pool allows a connection to be re-used without the cost of creating and verifying a connection each time a connection is needed. A connection pool typically specifies a number of allowable connections to the backend. When a thread in the application server needs to make a request to the backend, it first obtains a connection from the connection pool, then makes the request using the connection. If the maximum number of allowable connections is already being used, the next request must wait until one of the connections in the pool finishes its current task and becomes available.

A problem associated with connection pooling occurs in the context of a backend failure. Many backends have no architected way to indicate they have failed. As a result, when a backend fails, connections in the connection pool will simply hang because the backend has failed and is not able to service the requests. Many backends are being designed to quickly recover (or failover) in the event of a failure. However, even the quick recovery of a failed backend does not help the problem of the stalled connections in the connection pool. Application servers typically use a TCP timeout mechanism to time out a connection when one end of the connection becomes unresponsive. However, the TCP timeout value is typically a global value for a computer system, which does not allow customizing the TCP timeout value to different applications. Ofttimes, the TCP timeout value is specified in minutes, and may be significantly longer than the time required for the backend to failover.

A simple example will illustrate the problem in the prior art. Let's assume an application server has a connection pool for a DB2 database backend that is designed to failover in ten seconds. Let's also assume that the TCP timeout value is set to five minutes, and we have a connection pool with six allowable connections. We further assume that all six allowable connections in the connection pool are being used by the application server to access the DB2 database. We now assume the DB2 database fails. The six pending connections in the connection pool will hang because the DB2 database has failed. Even though it takes only ten seconds for the DB2 database to failover, the six connections will remain hung until five minutes of inactivity on each connection. The result is two-fold: 1) the DB2 database cannot be accessed for nearly five minutes after it failed over, even though it failed over in ten seconds; and 2) threads that are waiting on the hung connections will be unable to do any work for the five minute period. In addition, if the maximum number of threads on the application server are all servicing hung connections, there will be no way for the application server to do any work, even work that does not access the database, until the connections time out and the threads bound to the connections are freed up. The result is a backend that is unavailable for nearly five minutes while waiting for the TCP timeout period for each connection to expire, even though the backend recovers from a failure in ten seconds. Without a way to more efficiently deal with backend failure in an application server, the computer industry will continue to suffer from poor performance in an application server when a backend fails.

DISCLOSURE OF INVENTION

According to the preferred embodiments, an application server includes a connection pool that specifies a number of allowable connections, and includes a backend failure detection mechanism and a backend failure recovery mechanism. When the backend failure detection mechanism detects that the backend fails, applications waiting on the hung connections may be notified of the backend failure. New requests from applications for connections from the pool will fail and return immediately rather than blocking while waiting for a free connection. The backend failure detection mechanism will then detect when the backend recovers and becomes available once again. Once the backend is available again, the backend failure recovery mechanism increases the number of connections in the connection pool to compensate for the hung connections. In this manner, new connections may be created and placed in the pool, thereby allowing work to be performed even though there are hung connections in the connection pool. As each hung connection is timed out using a network timeout mechanism, the number of allowable connections is reduced. Eventually all of the hung connections will time out, with the result being that the connection pool will contain the same specified number of allowable connections it originally had before the backend failed.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to application servers that are coupled to one or more backends. For those not familiar with backends or application servers, this Overview section will provide background information that will help to understand the present invention.

Known Application Servers

Known application servers typically provide an interface for applications to access services provided by a backend, such as a database, messaging service, other application server, etc. One sample prior art configuration for an application server is shown in system 200 in FIG. 2. System 200 includes multiple applications 210A, 210B, . . . , 210N that are each coupled to an application server 220, which is coupled to a backend 230. The application server 220 includes a connection pool 224. The connection pool 224 includes a specified number of allowable connections 227, and one or more connections 228, shown in FIG. 2 as connections 228A to 228N. Note that the total number of connections 228 in the connection pool 224 cannot exceed the number of allowable connections 227.

Figure 2:
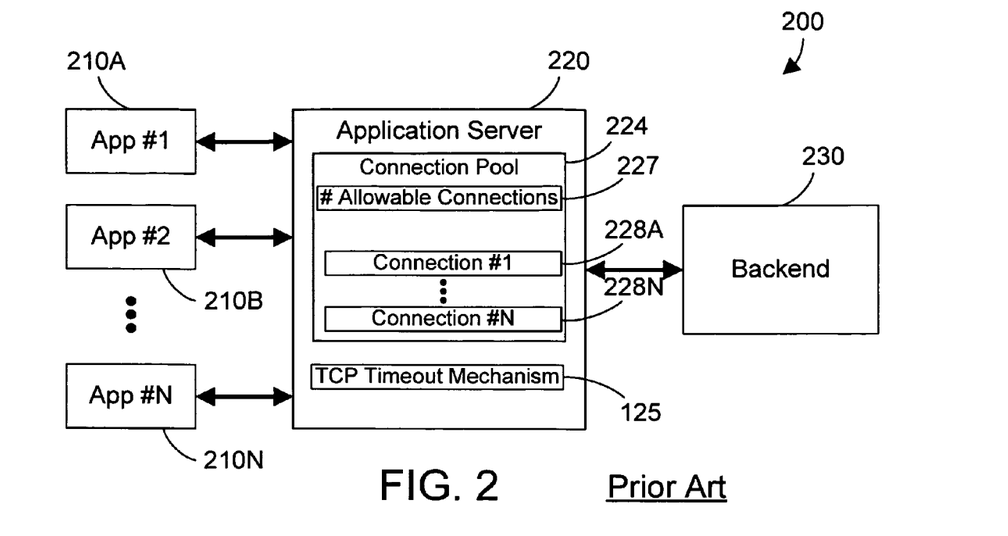
FIG. 2 is a block diagram of a prior art computer system showing interaction between software components.

Application server 220 also includes a Transmission Control Protocol (TCP) timeout mechanism 125. The TCP timeout mechanism 125 is not a specific feature of the application server 220, but is most often a global timeout mechanism 125 for any TCP communications in the computer system that includes the application server 220. The TCP timeout mechanism specifies a timeout value, typically on the order of minutes, for timing out TCP connections that become unresponsive. In prior art system 200, this TCP timeout mechanism 125 is the primary mechanism that is used to time out connections 228 in the connection pool 224 when backend 230 fails.

Figure 3:
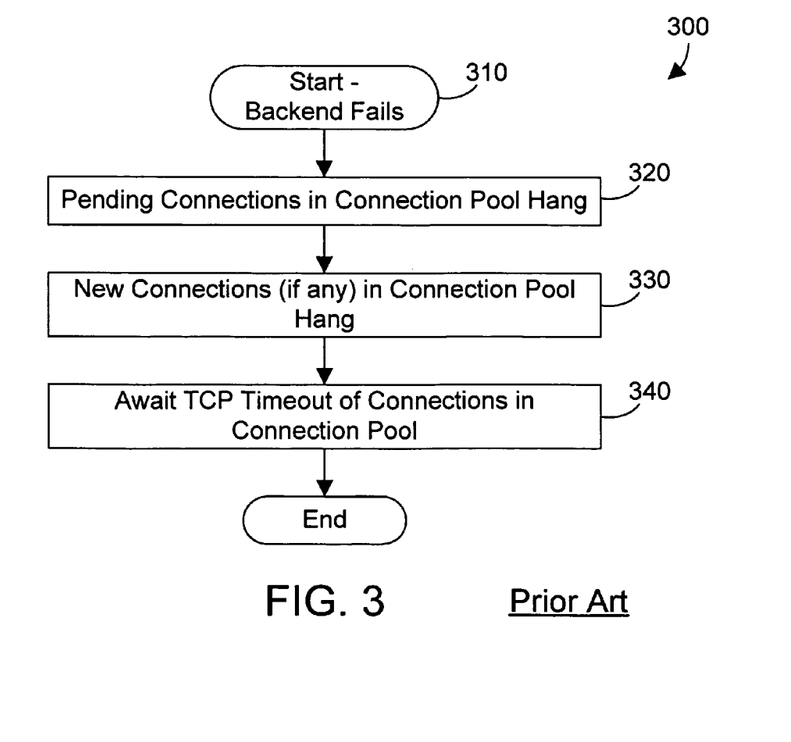
FIG. 3 is a flow diagram of a prior art method for an application server to handle failover of a backend.

Referring to FIG. 3, a prior art method 300 for an application server to handle a backend failure begins when the backend fails (step 310). The result of the failure is that all pending connections in the connection pool hang (step 320). Any new connections that are created in the connection pool also hang (step 330) because the backend has failed. At this point, method 300 awaits the TCP timeout of the connections in the connection pool (step 340). Note, however, that the TCP timeout of connections in the connection pool may be significantly longer than the period of time required for the backend to recover (or failover). If this is the case, the application server 220 will remain mostly idle until the connections in the connection pool begin to timeout. Thus, if the backend can failover in ten seconds, but the TCP timeout period is five minutes, the application server will remain mostly idle for four minutes and fifty seconds longer than the recovery time for the backend. The result is an application server that is stuck until the connections satisfy the TCP timeout period. This result is undesirable, and negatively impacts performance of the application server when a backend fails.

2.0 Description of the Preferred Embodiments

The preferred embodiments provide a mechanism for detecting when a backend fails, and for allowing an application server to quickly get back to work as soon as the backend has failed over. This is accomplished by detecting the backend failure, detecting when the backend has failed over, and temporarily increasing the number of allowable connections so work can continue even though the old connections in the connection pool have not yet timed out. As these hung connections time out one by one, the number of allowable connections is decremented by one. The result is the ability to do work while the connections are hung, with a return to the number of allowable connections that existed before the backend failure once all of the hung connections are timed out.

Figure 1:
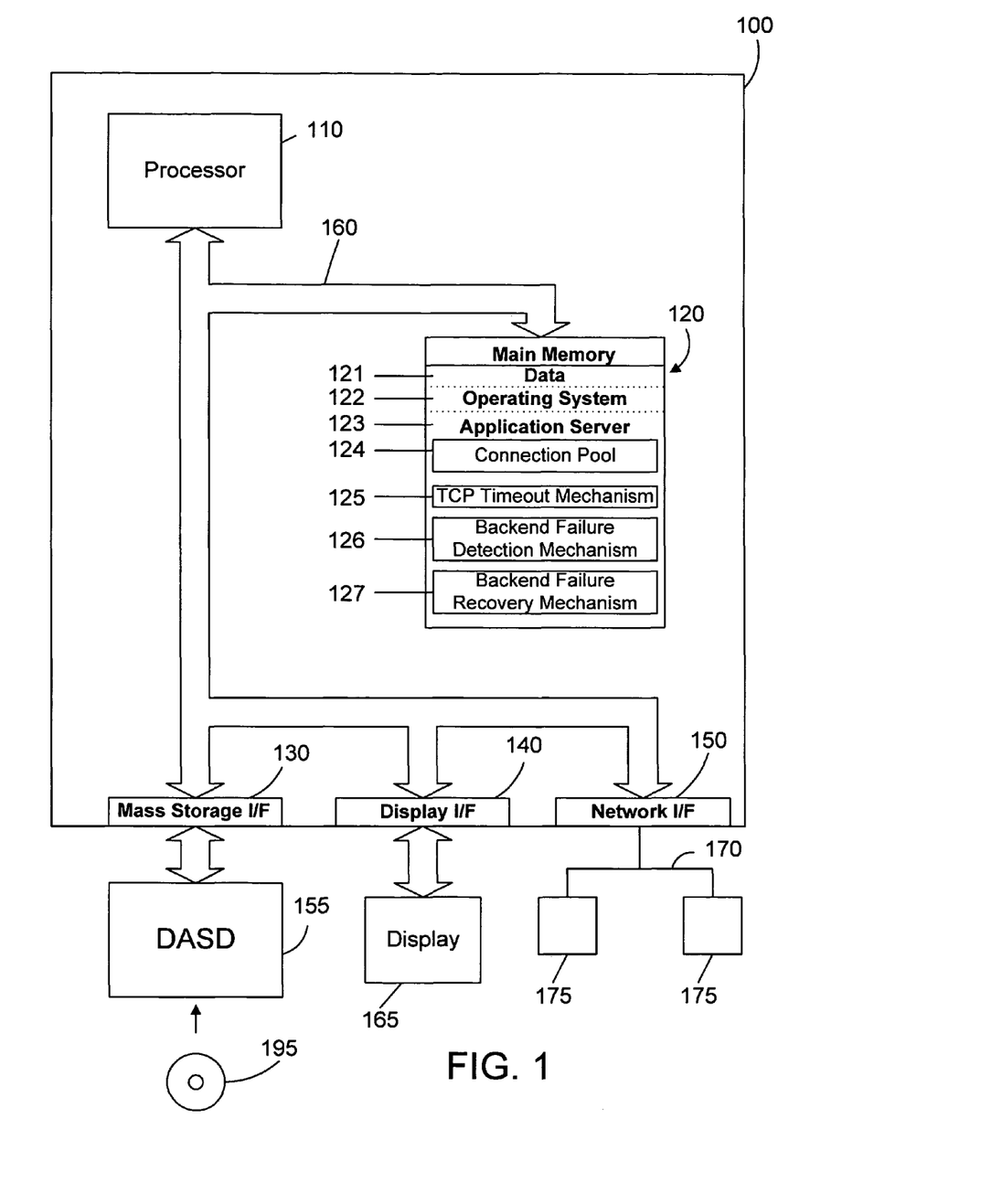
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system that serves as an application server. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, and an application server 123. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Application server 123 includes a connection pool 124, a TCP timeout mechanism 125, a backend failure detection mechanism 126, and a backend failure recovery mechanism 127. The connection pool 124 is preferably the same as the prior art connection pool 224 shown in FIG. 2, but could also be a different connection pool that is not known in the art. The TCP timeout mechanism 125 is the commonly-used TCP timeout mechanism that is known in the art. Note that TCP timeout mechanism 125 is one specific type of a suitable timeout mechanism for a network protocol, and the preferred embodiments expressly extend to any suitable timeout mechanism for any suitable network protocol, whether now known or developed in the future. The backend failure detection mechanism 126 is a mechanism that periodically makes requests to a backend to make sure the backend is still responsive to the request. If the backend fails to respond to a request, the backend failure detection mechanism 126 knows the backend has failed. In one suitable implementation, the backend failure detection mechanism 126 is a heartbeat mechanism that periodically requests a connection to the backend. To avoid hanging, the heartbeat mechanism is executed by a first thread, and uses a different thread to make the request. The first thread may then monitor the different thread. If the different thread hangs, the first thread knows the backend has failed. The backend failure recovery mechanism 127 receives a signal when the backend failure detection mechanism 126 detects that the backend has failed, and also receives a signal when the backend failure detection mechanism 126 detects that the backend has failed over (i.e., has recovered from the error). The backend failure recovery mechanism 127 then takes appropriate action to avoid stalling the entire application server until the TCP timeout mechanism 125 times out the connections in the connection pool. The detailed function of the backend failure recovery mechanism 127 is described in more detail below with reference to FIGS. 5-11.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and application server 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 4:
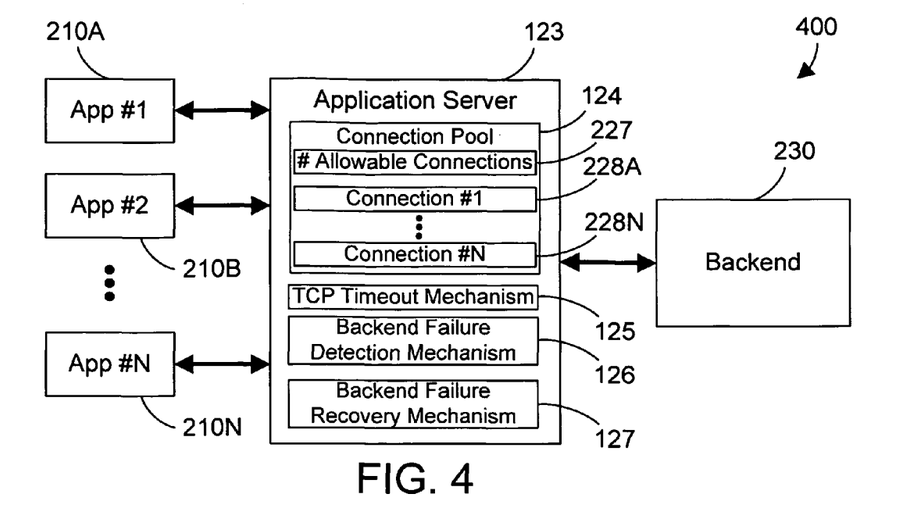
FIG. 4 is a block diagram of a computer system in accordance with the preferred embodiments showing interaction between software components.

Referring now to FIG. 4, a computer system 400 represents the interaction of the application server 123 in FIG. 1 with various applications 210A, 210B, . . . , 210N and a backend 230. The connection pool 124 suitably includes a specified number of allowable connections 227 and one or more connections 228, shown in FIG. 4 as connection 228A, . . . , connection 228N. The backend failure detection mechanism 126 periodically heartbeats the backend 230 by sending a request for a connection to the backend 230. The interval at which the backend is heart beated is configurable. The heart beating would simply be an attempt by the backend failure detection mechanism 126 to open a new connection to the backend 230. If the attempt to open a new connection succeeds, the connection is closed and the backend failure detection mechanism 126 knows that the backend 230 is alive. If the attempt to open a new connection fails or hangs for a configurable period of time, the backend failure detection mechanism 126 knows that the backend 230 has failed. The backend failure detection mechanism 126 signals the failure of the backend 230 to the backend recovery mechanism 127, which then takes appropriate action to assure the application server may continue working even before the TCP timeout mechanism 125 times out stalled connections in the connection pool 124.

Figure 5:
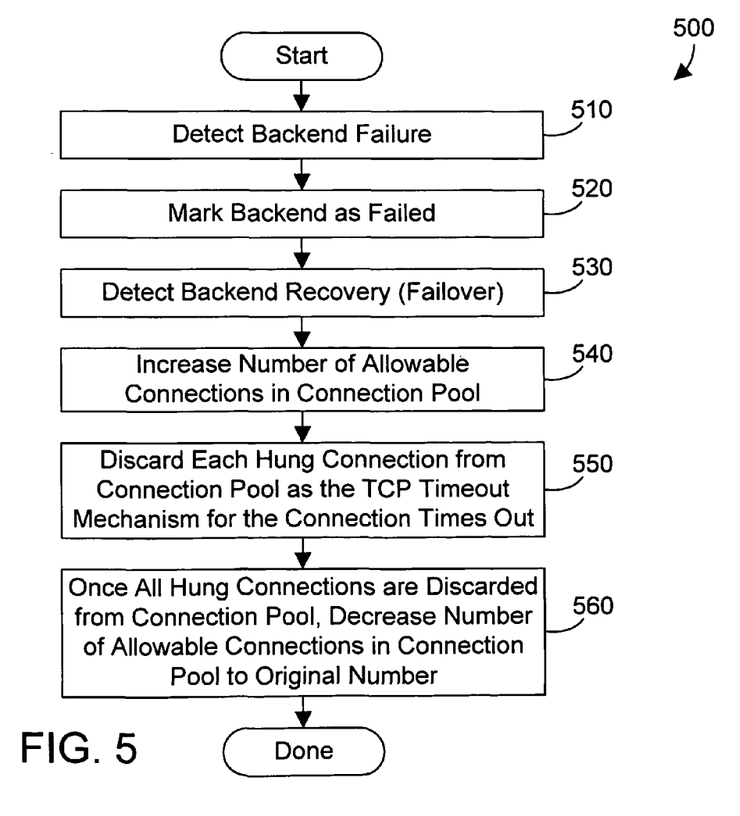
FIG. 5 is a flow diagram of a method for an application server to handle backend failover in accordance with the preferred embodiments.

Referring to FIG. 5, a method 500 in accordance with the preferred embodiments is preferably performed by the application server 123. First, a backend failure is detected (step 510). The backend is marked as failed (step 520), which means that the application server may respond to all pending application requests for connections to the backend by informing the requesting applications that the backend has failed. This allows the applications to know of the failure rather than just hanging while waiting for the TCP timeout mechanism 125 to time out. This also frees up threads in the application server from being stalled while waiting for hung connections, making the threads available to do work, such as report the failure immediately to the application client rather than wait with a blank screen. When the backend recovers (by failing over), this recovery is detected (step 530). The backend failure recovery mechanism knows that the backend has failed over, but also knows that the connections in the connection pool are stalled due to the failure. As a result, the backend failure recovery mechanism increases the number of allowable connections in the connection pool (step 540). In the most preferred implementation, the number of allowable connections in the connection pool is increased by the number of hung connections in step 540. This allows work to continue even though all of the previous connections in the connection pool have stalled due to the backend failure. As the work by the application server continues, eventually each hung connection in the connection pool will time out using the TCP timeout mechanism 125. When a connection times out, it is discarded from the connection pool (step 550). As each hung connections is discarded from the connection pool, the number of allowable connections in the connection pool are decreased, eventually reaching the original number of allowable connections before the backend failure (step 560). In one implementation in accordance with the preferred embodiments, as each connection times out in step 550 and is discarded from the connection pool, the number of allowable connections in the connection pool is decremented by one. Once the last hung connection is discarded from the connection pool, the number of allowable connections is decremented one last time, which takes the number of allowable connections back to the previous value before the backend failure.

Figure 6:
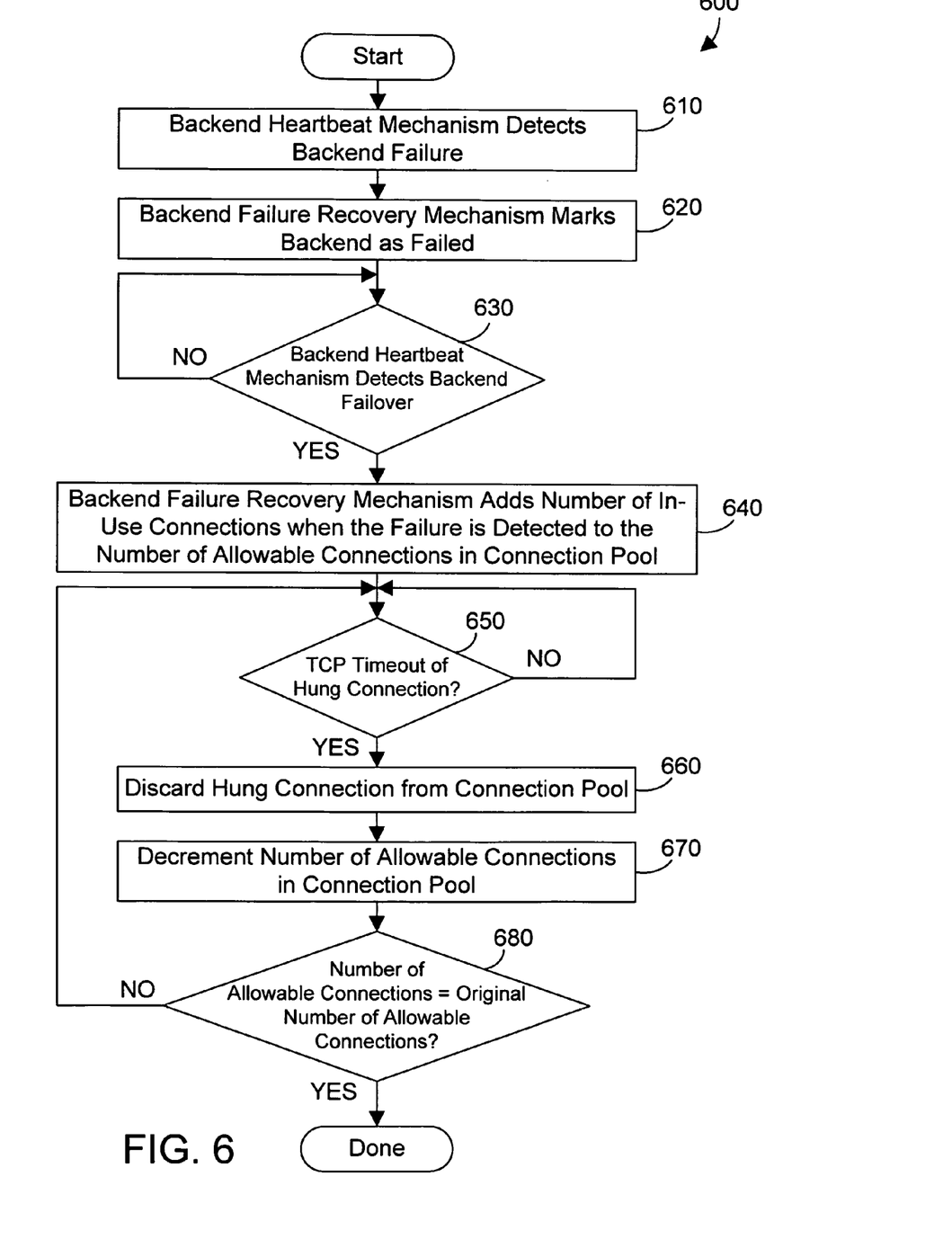
FIG. 6 is a flow diagram of a specific method for an application server to handle backend failover in accordance with the preferred embodiments.

One specific implementation in accordance with method 500 in FIG. 5 is shown as method 600 in FIG. 6. In this implementation, the backend failure detection mechanism is called a backend heartbeat mechanism. The backend heartbeat mechanism detects when the backend fails (step 610). The backend failure recovery mechanism marks the backend as failed (step 620), which allows the application server 123 to respond to pending requests for the backend that the backend has failed, rather than waiting around for the TCP timeout mechanism to time out the connection. Next, the backend heartbeat mechanism determines whether the backend has successfully failed over (step 630). If not (step 630=NO), method 600 waits. Once the backend heartbeat mechanism detects that the backend has failed over (step 630=YES), the backend failure recovery mechanism increases the number of connections in the connection pool by the number of hung connections (step 640). Thus, if a connection pool has ten allowable connections, and eight of the allowable connections are in use when the backend fails, the backend failure recovery mechanism increases the number of connections in the connection pool from 10 to 18. This increase in the number of allowable connections allows work by the application server to continue, because new connections in the connection pool will be able to do work with the failed over backend even though the existing connections in the connection pool will all be hung, waiting for a response from the failed backend. Method 600 then waits for a TCP timeout of a hung connection in the connection pool (step 650). Once the TCP timeout occurs (step 650=YES), the hung connection is discarded from the connection pool (step 660), and the number of connections in the connection pool is decremented by one (step 670). If the number of allowable connections does not equal the original number of allowable connections before the backend failure, method 600 loops back to step 650 and continues. Once the number of allowable connections equals the original number of allowable connections before the backend failure (step 680=YES), method 600 is done.

Figure 7:
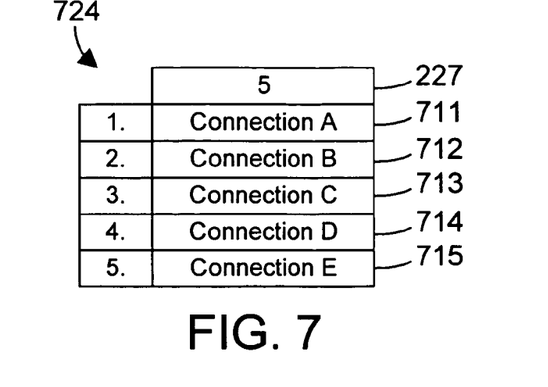
FIG. 7 is a block diagram of a sample connection table to illustrate steps in method 600 in FIG. 6.
Figure 8:
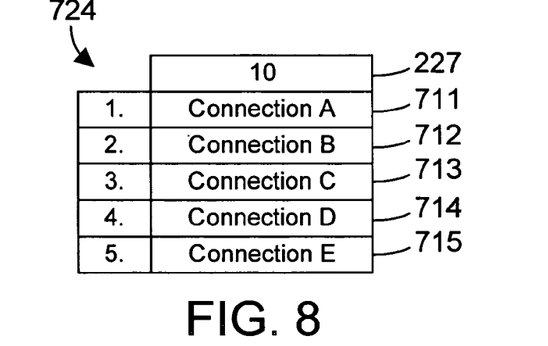
FIG. 8 is a block diagram of the sample connection table in FIG. 7 after the number of allowable connections has been doubled in step 640 in FIG. 6.
Figure 9:
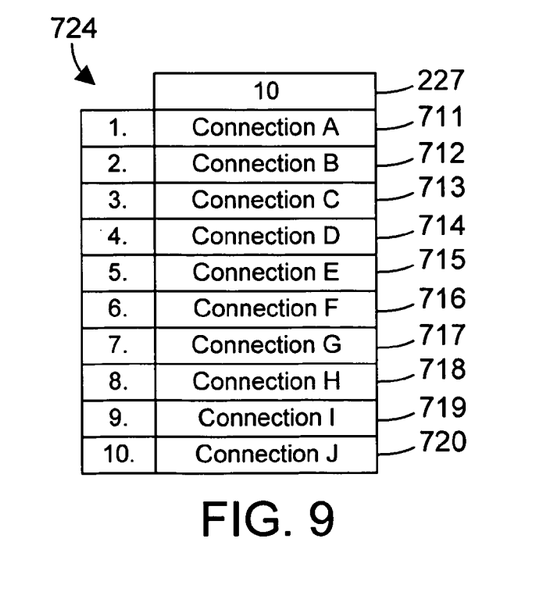
FIG. 9 is a block diagram of the sample connection table in FIG. 8 after the application server has established five additional connections.
Figure 10:
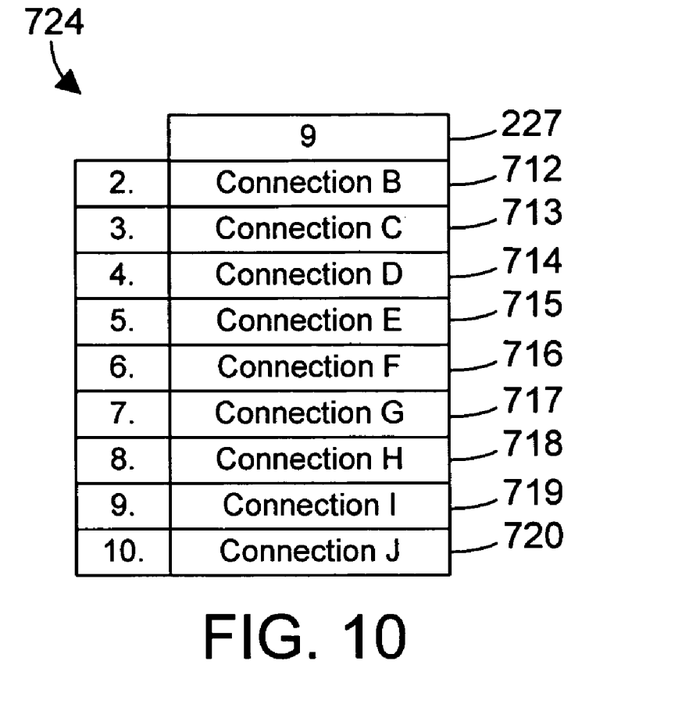
FIG. 10 is a block diagram of the sample connection table in FIG. 9 after the hung connection 711 has been discarded and after the number of allowable connections has been decremented by one.

An example now follows to illustrate the function of method 600 shown in FIG. 6. Referring to FIG. 7, we assume an application server 123 includes a connection pool 724, which is one specific implementation of the connection pool 124 shown in FIGS. 1, 2 and 4. The number of allowable connections 227 for this connection pool 724 is arbitrarily set to five for the purpose of illustration. We assume that the connection pool 124 includes five connections 711, 712, 713, 714 and 715, as shown in FIG. 7. We now assume that the backend fails, which means that steps 610 and 620 in FIG. 6 are performed. Once the backend fails over (step 630=YES), the backend failure recovery mechanism increases the number of connections in the connection pool by the number of connections that existed when the backend failed (step 640). The result is that the number of allowable connections 227 for the connection pool 724 is increased from five to ten, as shown in FIG. 8. This increase in the number of allowable connections allows the application server to create new connections while waiting for the hung connections 711-715 to time out using the TCP timeout mechanism. Thus, five additional connections 716-720 may be created in the connection pool even though the original five connections 711-715 are hung, as shown in FIG. 9. These additional five connections 716-720 are used by the application server to do work right after the backend fails over, without waiting for the TCP timeout of the original five connections 711-715.

Figure 11:
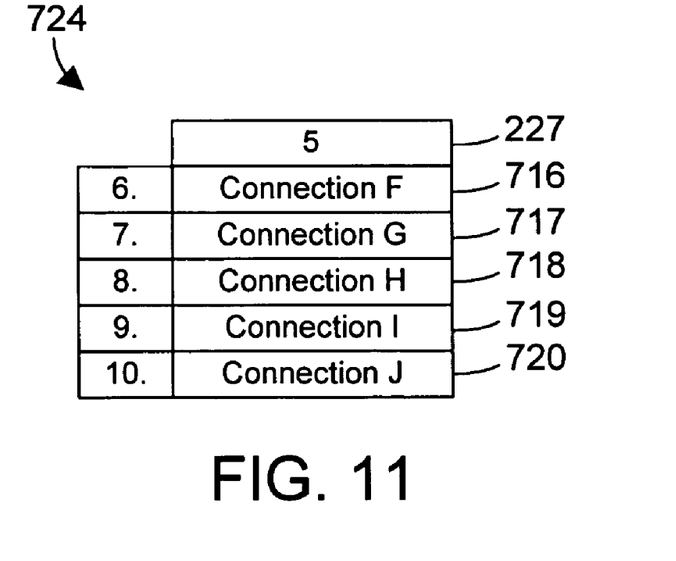
FIG. 11 is a block diagram of the sample connection table in FIG. 10 after the remaining hung connections 712-715 have been discarded and after the number of allowable connections has been decremented to the original value of five shown in FIG. 7.

Now we assume that connection 711 finally times out using the TCP timeout mechanism (step 650=YES). As a result, the connection 711 is discarded from the pool (step 660) and the number of allowable connections in the connection pool is decremented by one (step 670), resulting in the connection pool shown in FIG. 10. This process continues one by one until the other four original connections 712-715 each time out, with each time out decrementing the number of allowable connections by one. Finally, once the last hung connection times out (step 650=YES), the last hung connection is discarded from the connection pool (step 660), and the number of allowable connections is decremented by one (step 670). The result is a connection pool as shown in FIG. 11, which has five allowable connections, the same as in the original connection pool shown in FIG. 7 (step 680=YES).

While the specific implementation shown in FIG. 6 shows doubling the number of connections in step 640, the preferred embodiments expressly extend to any increase in the number of connections in the connection pool. The preferred embodiments also expressly extend to any suitable heuristic for decreasing the number of allowable connections in the connection pool to the original number before the failure.

The apparatus and methods of the preferred embodiments provide a way for an application server to continue to do work after a backend fails and recovers without having to wait for the lengthy TCP timeout period to expire. The number of connections in the connection pool is increased, then decremented when the hung connections in the connection pool time out. As a result, the performance of the application server is far greater using the preferred embodiments when a backend failure occurs.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for an application server to handle failure of a backend coupled to the application server, the method comprising the steps of:
    (A) detecting when the backend fails by periodically determining if the backend is responsive to a request to the backend;
    (B) when the backend fails, temporarily increasing a specified number of allowable connections in a connection pool to the backend by the number of connections in use in the connection pool when the backend fails;

(C) detecting when the backend recovers from the failure; and
(D) in response to the backend recovering from the failure, reducing the specified number of allowable connections in the connection pool to the specified number of allowable connections in the connection pool before the backend failure by decrementing the specified number of allowable connections in the connection pool each time a network timeout mechanism indicates a connection in the connection pool has timed out.

\* \* \* \* \*